United States Patent
Takahashi et al.

(10) Patent No.: US 10,562,733 B2
(45) Date of Patent: Feb. 18, 2020

(54) SHEET PROCESSING DEVICE INCLUDING A STAPLE BINDING UNIT AND A STAPLELESS BINDING UNIT AND IMAGE FORMING SYSTEM

(71) Applicants: Wataru Takahashi, Tokyo (JP); Katsuhiro Kosuge, Kanagawa (JP); Nobuyoshi Suzuki, Tokyo (JP); Hidehiko Fujiwara, Tokyo (JP); Yuusuke Shibasaki, Kanagawa (JP); Koki Sakano, Kanagawa (JP); Takuya Morinaga, Tokyo (JP)

(72) Inventors: Wataru Takahashi, Tokyo (JP); Katsuhiro Kosuge, Kanagawa (JP); Nobuyoshi Suzuki, Tokyo (JP); Hidehiko Fujiwara, Tokyo (JP); Yuusuke Shibasaki, Kanagawa (JP); Koki Sakano, Kanagawa (JP); Takuya Morinaga, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/648,579

(22) Filed: Jul. 13, 2017

(65) Prior Publication Data
US 2017/0305706 A1 Oct. 26, 2017

Related U.S. Application Data

(63) Continuation of application No. 14/726,709, filed on Jun. 1, 2015, now Pat. No. 9,725,276.

(30) Foreign Application Priority Data

Jun. 16, 2014 (JP) .................................. 2014-123687

(51) Int. Cl.
*B65H 37/04* (2006.01)
*H04N 1/00* (2006.01)
(Continued)

(52) U.S. Cl.
CPC ............. *B65H 37/04* (2013.01); *B65H 31/26* (2013.01); *G03G 15/6544* (2013.01);
(Continued)

(58) Field of Classification Search
CPC .... B65H 37/04; B65H 31/26; G03G 15/6544; G04N 1/00639
(Continued)

(56) References Cited

U.S. PATENT DOCUMENTS 5,187,534 A 2/1993 Iwata et al.
5,478,062 A 12/1995 Horiuchi et al.
(Continued)

FOREIGN PATENT DOCUMENTS

JP H10279163 A 10/1998
JP 2001-19268 A 1/2001
(Continued)

OTHER PUBLICATIONS

Office Action for corresponding Japanese Patent Application No. 2015-101217 dated Feb. 26, 2019 and English translation thereof.

*Primary Examiner* — Patrick H Mackey
(74) *Attorney, Agent, or Firm* — Harness, Dickey & Pierce, P.L.C.

(57) ABSTRACT

A sheet processing device is for binding sheets together. The sheet processing device includes binding units differing from each other in maximum sheet count, the maximum sheet count being a maximum number of sheets that can be bound at a time; a sheet tray configured to hold sheets until all to-be-bound sheets are placed therein, the number of the to-be-bound sheets being a largest one of the maximum (Continued)

sheet counts of the binding units or smaller; and a stacked-sheet-count limiting unit situated in a thickness direction of the sheets held in the sheet tray. The stacked-sheet-count limiting unit is configured to limit the number of sheets held in the sheet tray by varying a distance from a sheet support surface of the sheet tray on which the sheets are placed, depending on one of the binding units by which the sheets held in the sheet tray are to be bound.

6 Claims, 14 Drawing Sheets

(51) Int. Cl.
  *B65H 31/26* (2006.01)
  *G03G 15/00* (2006.01)
(52) U.S. Cl.
  CPC . *H04N 1/00639* (2013.01); *B65H 2301/4213* (2013.01); *B65H 2301/4223* (2013.01); *B65H 2403/945* (2013.01); *B65H 2404/61* (2013.01); *B65H 2404/63* (2013.01); *B65H 2511/214* (2013.01); *B65H 2511/30* (2013.01); *B65H 2601/271* (2013.01); *B65H 2801/27* (2013.01); *G03G 2215/00911* (2013.01); *H04N 2201/0094* (2013.01)
(58) Field of Classification Search
  USPC ...................................................... 270/58.09
  See application file for complete search history.

(56) References Cited

U.S. PATENT DOCUMENTS

| | | | |
|---|---|---|---|
| 5,609,333 A | 3/1997 | Mandel et al. | |
| 6,145,825 A | 11/2000 | Kunihiro et al. | |
| 6,550,757 B2 | 4/2003 | Sesek | |
| 6,773,004 B2 | 8/2004 | Obregon et al. | |
| 7,396,008 B2 | 7/2008 | Sato et al. | |
| 7,419,150 B2 * | 9/2008 | Kushida | B42C 1/12 270/58.07 |
| 7,980,544 B2 | 7/2011 | Baba et al. | |
| 8,235,375 B2 | 8/2012 | Shiraishi | |
| 8,297,610 B2 * | 10/2012 | Shiraishi | B65H 37/04 270/58.08 |
| 8,905,393 B2 | 12/2014 | Ando et al. | |
| 9,400,173 B2 | 7/2016 | Balili et al. | |
| 9,725,276 B2 * | 8/2017 | Takahashi | B65H 31/26 |
| 2008/0315494 A1 | 12/2008 | Terao et al. | |
| 2008/0315505 A1 | 12/2008 | Terao et al. | |
| 2008/0315506 A1 | 12/2008 | Terao et al. | |
| 2012/0018944 A1 * | 1/2012 | Shiraishi | B42C 1/12 270/58.09 |
| 2014/0077437 A1 * | 3/2014 | Abe | G03G 15/6541 270/58.12 |
| 2014/0219747 A1 | 8/2014 | Takahashi et al. | |
| 2015/0028540 A1 | 1/2015 | Shibasaki et al. | |
| 2015/0030414 A1 | 1/2015 | Takahashi et al. | |
| 2015/0037120 A1 * | 2/2015 | Kubo | B42C 1/12 412/33 |
| 2015/0076759 A1 | 3/2015 | Kosuge et al. | |
| 2015/0091246 A1 | 4/2015 | Yoshida et al. | |
| 2015/0093214 A1 | 4/2015 | Takahashi et al. | |

FOREIGN PATENT DOCUMENTS

| | | |
|---|---|---|
| JP | 2004-167700 A | 6/2004 |
| JP | 2004-168435 A | 6/2004 |
| JP | 2005-263404 A | 9/2005 |
| JP | 2008-290847 A | 12/2008 |
| JP | 2011-246283 A | 12/2011 |
| JP | 2014-76902 A | 5/2014 |

* cited by examiner

SUB-SCANNING DIRECTION

FIG.17
(a)
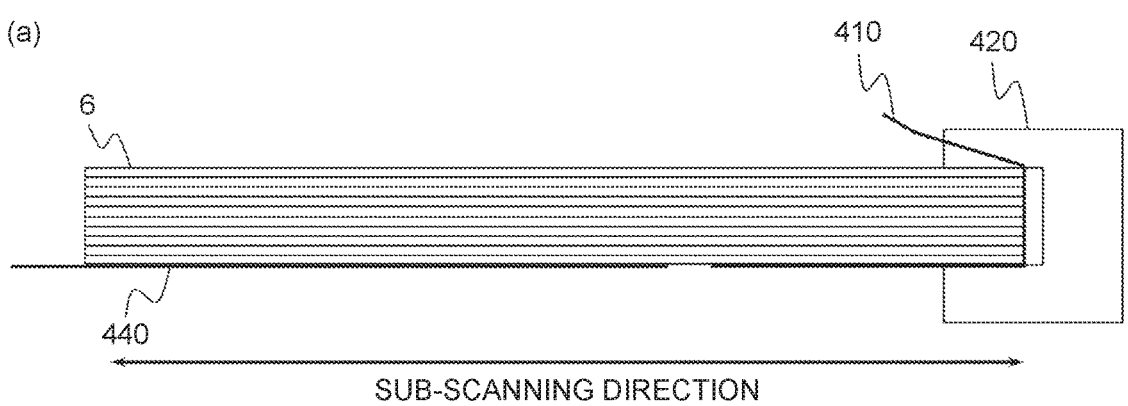
SUB-SCANNING DIRECTION
(b)
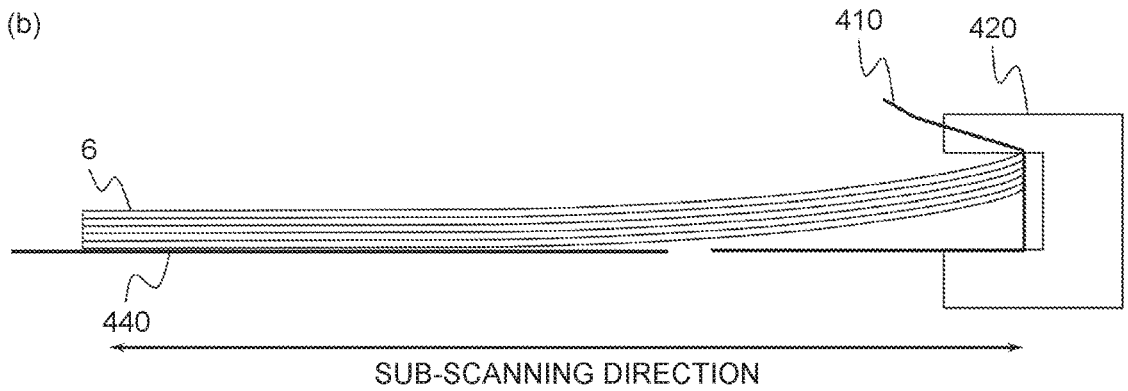
SUB-SCANNING DIRECTION FIG.18
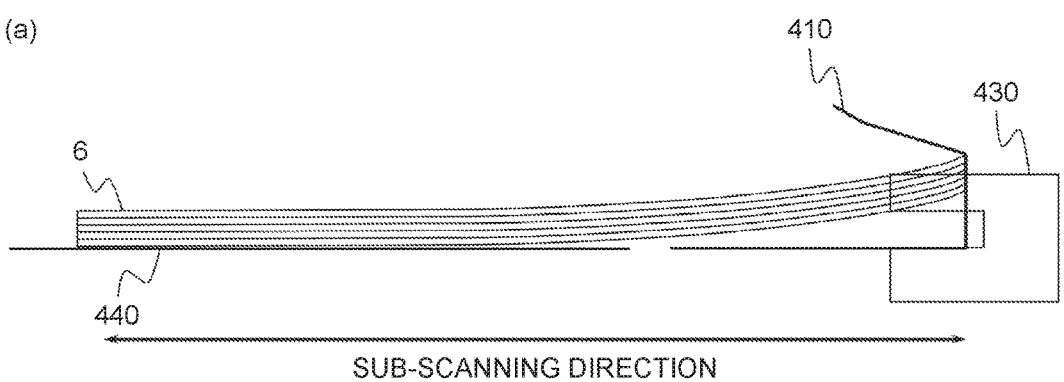
(a)
SUB-SCANNING DIRECTION
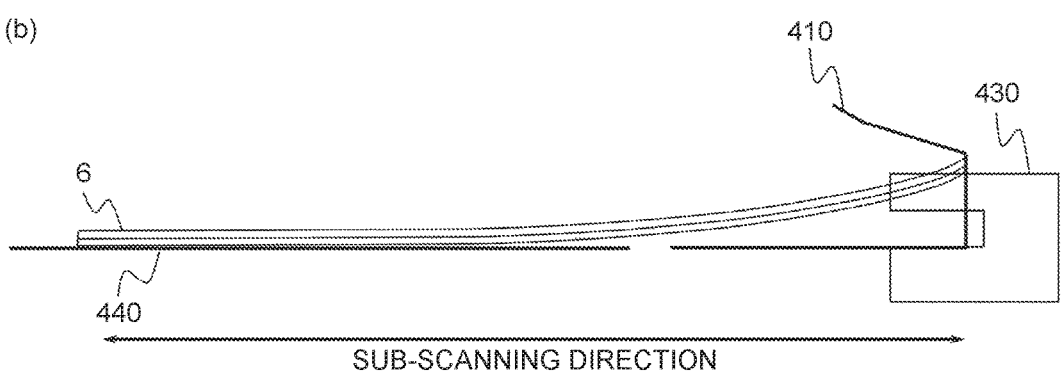
(b)
SUB-SCANNING DIRECTION FIG.19
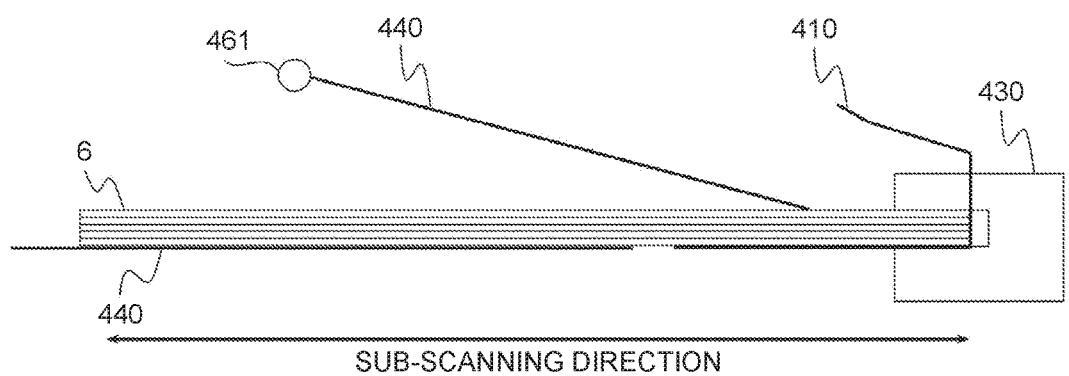
(a) SUB-SCANNING DIRECTION
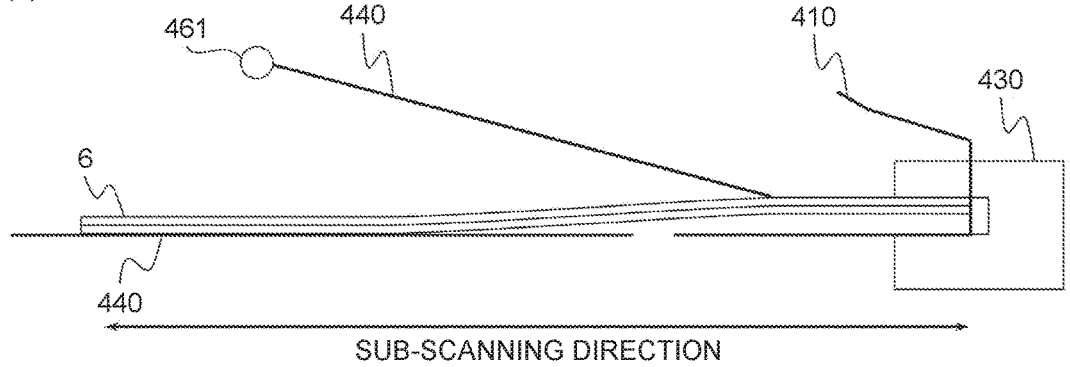
(b) SUB-SCANNING DIRECTION

SHEET PROCESSING DEVICE INCLUDING A STAPLE BINDING UNIT AND A STAPLELESS BINDING UNIT AND IMAGE FORMING SYSTEM

CROSS-REFERENCE TO RELATED APPLICATION

This application is a continuation application of and claims priority under 35 U.S.C. § 120/121 to U.S. application Ser. No. 14/726,709 filed Jun. 1, 2015, which claims priority under 35 U.S.C. § 119(a) to Japanese Patent Application No. 2014-123687 filed in Japan on Jun. 16, 2014, the entire contents of each of which are hereby incorporated by reference herein.

BACKGROUND OF THE INVENTION

1. Field of the Invention

The present invention relates generally to a sheet processing device and an image forming system and, more particularly, to sheet binding.

2. Description of the Related Art

Increasing digitization of information in recent years has made image processing apparatuses such as printers and facsimiles for use in outputting digitized information and scanners for use in digitalizing documents indispensable. Such an image processing apparatus is typically configured as a multifunction peripheral (MFP) having an image capture function, an image forming function, a communication function, and the like and usable as a printer, a facsimile, a scanner, and a copier.

It is known that some type of MFPs is equipped with a binding device that binds a bundle of a plurality of sheets, on which images are formed by the MFP, together. Schemes used by such a binding device in binding a sheet bundle include a scheme (hereinafter, "staple binding") with use of a metal staple(s) and a scheme (hereinafter, "stapleless binding") without use of a metal staple.

As such a binding device as that described above, a binding device capable of both staple binding and stapleless binding has been proposed and known. An example is disclosed in Japanese Laid-open Patent Application No. 2004-168435. Binding devices capable of both the schemes are typically configured to perform binding as follows. First, a selected one of a staple binding unit that performs staple binding and a stapleless binding unit that performs stapleless binding is moved from its home position to a binding position. The binding device then receives a sheet bundle into a binding channel of the moved binding unit and sandwiches the received sheet bundle from above and below sheet surfaces, thereby binding the sheet bundle.

Some type of the binding devices capable of both the schemes is configured such that the maximum number of sheets (hereinafter, "maximum sheet count") that can be bound at a time by staple binding differs from that of stapleless binding. In some binding devices of this type, a compiling unit where sheets are to be stacked in a pile until all to-be-bound sheets are placed therein is designed to have a height adjusted to a larger one of the maximum sheet counts. A binding device configured in this manner can stack, even if the maximum sheet counts differ between staple binding and stapleless binding, a corresponding maximum sheet count of sheets for each of the schemes.

However, when the compiling unit of the binding device is designed to have a height adjusted to a larger one of the maximum sheet counts, the following disadvantage can occur. When a sheet bundle is to be bound using one, which is smaller in the maximum sheet count, of the schemes, even if the sheet bundle contains the maximum sheet count of sheets, a clearance in the direction of sheet thickness is left in the compiling unit. The clearance can cause curling, deflection, or the like to occur in the sheet bundle at a binding position. Accordingly, the binding device configured as described above can have the following problem. When a sheet bundle is to be bound using the one, which is smaller in the maximum sheet count, of the schemes, even if the sheet bundle contains the maximum sheet count of stacked sheets or less, the curling or deflection described above can increase the thickness of the sheet bundle relative to the thickness of the sheet bundle free from the curling, deflection, or the like (hereinafter, "should be thickness") to exceed opening height of the binding channel. As a result, the sheet bundle cannot be received into the binding channel.

A method of pressing the sheet bundle stacked in the compiling unit of the binding device in the direction of sheet thickness may be applicable. Examples of this method are disclosed in Japanese Laid-open Patent Publication No. 2005-263404 and Japanese Laid-open Patent Publication No. 10-279163. When the binding device is configured to apply this method, occurrence of the curling, deflection, or the like can be reduced even if a clearance in the sheet thickness direction is left in the compiling unit.

However, such a binding device has a disadvantage that arises from the need of pressing a sheet bundle stacked in the compiling unit in the sheet thickness direction. That is, a pressing member that presses the sheet bundle can interfere with sheet conveyance. This disadvantage can be avoided by configuring the binding device to include compiling units independently, one for staple binding and the other for stapleless binding. However, this configuration disadvantageously increases manufacturing cost and device size due to an increase in the number of parts and control systems.

Therefore, there is a need for a sheet processing device capable of binding sheets without interfering with sheet conveyance with an inexpensive, compact, and simple configuration.

SUMMARY OF THE INVENTION

It is an object of the present invention to at least partially solve the problems in the conventional technology.

According to an embodiment, there is provided a sheet processing device for binding a plurality of sheets together. The sheet processing device includes a plurality of binding units differing from each other in maximum sheet count, the maximum sheet count being a maximum number of sheets that can be bound at a time; a sheet tray configured to hold sheets until all to-be-bound sheets are placed therein, the number of the to-be-bound sheets being a largest one of the maximum sheet counts of the plurality of binding units or smaller; and a stacked-sheet-count limiting unit situated in a thickness direction of the sheets held in the sheet tray. The stacked-sheet-count limiting unit is configured to limit the number of sheets held in the sheet tray by varying a distance from a sheet support surface of the sheet tray on which the sheets are placed, depending on one of the binding units by which the plurality of sheets held in the sheet tray are to be bound.

According to another embodiment, there is provided an image forming system that includes an image forming apparatus configured to form images on a sheet; and the sheet processing device according to the above embodiment to bind a plurality of sheets together, an image is formed on each sheet by the image forming apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 illustrates side views, as viewed along the main-scanning direction, of the sheet binding engine not including a movable guide plate according to the embodiment;

FIG. 18 illustrates side views, as viewed along the main-scanning direction, of the sheet binding engine not including the movable guide plate according to the embodiment; and FIG. 19 illustrates side views, as viewed along the main-scanning direction, of the sheet binding engine according to the embodiment.

DETAILED DESCRIPTION OF THE PREFERRED EMBODIMENTS

Figure 1:
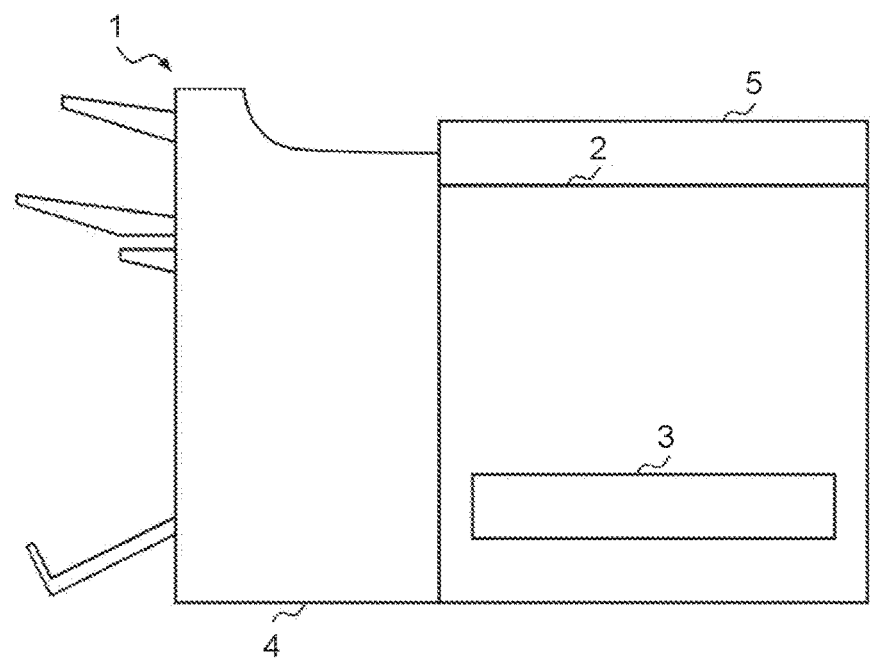
FIG. 1 is a simplified diagram illustrating an overall configuration of an image forming apparatus according to an embodiment of the present invention.

Exemplary embodiments of the present invention are described in detail below with reference to the accompanying drawings. As a particular example, an image forming apparatus including a sheet binding unit that binds a plurality of sheets of media or the like together according to an embodiment is described below.

The sheet binding unit according to the embodiment is configured to be capable of, as schemes for binding a plurality of sheets together, both a scheme with use of a metal staple(s) (hereinafter, "staple binding") and a scheme without use of a metal staple (hereinafter, "stapleless binding").

The sheet binding unit according to the embodiment is configured such that a maximum number of sheets (hereinafter, "maximum sheet count") that can be bound at a time by staple binding differs from that of stapleless binding. For this reason, a compiling unit where sheets are to be stacked in a pile until all to-be-bound sheets are placed therein is designed to have a height adjusted to a larger one of a first maximum sheet count, which is the maximum sheet count of staple binding, and a second maximum sheet count, which is the maximum sheet count of stapleless binding. Accordingly, the sheet binding unit according to the embodiment, in which the first maximum sheet count of staple binding differs from the second maximum sheet count of stapleless binding, is capable of stacking a corresponding maximum sheet count of sheets for each of staple binding and stapleless binding.

The sheet binding unit according to the embodiment is configured to operate as follows. In a pre-sheet-binding phase, a staple binding unit that performs staple binding and a stapleless binding unit that performs stapleless binding are on standby at their home positions. When sheet binding starts, a selected one of the staple binding unit and the stapleless binding unit is moved from its home position to a binding position. The sheet binding unit according to the embodiment is configured to receive a sheet bundle into a binding channel of the moved binding unit and sandwich the received sheet bundle from above and below sheet surfaces, thereby binding the sheet bundle.

However, the sheet binding unit configured in this manner can have the following disadvantage. When a sheet bundle is to be bound using one, which is smaller in the maximum sheet count, of the schemes, even if the sheet bundle contains the maximum sheet count of stacked sheets, a clearance in the sheet thickness direction is left. As a result, curling, deflection, or the like can occur at binding position. Accordingly, the sheet binding unit configured as described above can have the following problem. When a sheet bundle is to be bound using the one, which is smaller in the maximum sheet count, of the schemes, even if the sheet bundle contains the maximum sheet count of stacked sheets or less, the thickness of the sheet bundle is increased relative to the thickness of the sheet bundle free from the curling, deflection, or the like (hereinafter, "should be thickness") to exceed the opening height of the binding channel. As a result, the sheet bundle cannot be received into the binding channel.

Under the circumstances, the sheet binding unit according to the embodiment is configured to include a movable guide plate whose height in the sheet thickness direction varies depending on the maximum sheet count or, more specifically, whose height in the sheet thickness direction varies depending on by which one of the staple binding unit and the stapleless binding unit a sheet bundle is to be bound. Accordingly, in the sheet binding unit according to the embodiment, even if the curling, deflection, or the like occurs due to a clearance created in the thickness direction of sheets stacked in the compiling unit, the thickness of the sheet bundle does not exceed the movable guide plate.

By virtue of this configuration, when the sheet binding unit according to the embodiment performs sheet binding using one, which is smaller in the maximum sheet count, of the schemes, even if the curling, deflection, or the like occurs due to a clearance left in the thickness direction of sheets stacked in the compiling unit, the thickness of the sheet bundle does not exceed the opening height of the binding channel. As a result, an undesirable situation that the sheet bundle cannot be received into the binding channel is prevented.

Hence, the sheet binding unit according to the embodiment can reliably receive a sheet bundle even when the sheet binding unit does not include compiling units independently, one for staple binding and the other for stapleless binding, and the sheet bundle is to be bound using one, which is smaller in the maximum sheet count, of the schemes. The sheet binding unit according to the embodiment can be inexpensively manufactured and perform sheet binding with a compact and simple configuration.

An overall configuration of an image forming apparatus 1 according to the embodiment is described below with reference to FIG. 1. FIG. 1 is a simplified diagram illustrating the overall configuration of the image forming apparatus 1 according to the embodiment. As illustrated in FIG. 1, the image forming apparatus 1 according to the embodiment includes an image forming unit 2, a sheet feeding unit 3, a sheet binding unit 4, and a scanner unit 5.

The image forming unit 2 generates CMYK (cyan, magenta, yellow, and black planes) print information from input image data, and forms (outputs) an image on a sheet fed from the sheet feeding unit 3 according to the generated print information. The sheet feeding unit 3 feeds sheets, one at a time, to the image forming unit 2. The sheet binding unit 4 performs sheet binding on a plurality of image-formed sheets conveyed from the image forming unit 2. In the sheet binding unit 4 according to the embodiment, the maximum number of sheets that can be bound at a time (the first maximum sheet count) by staple binding differs from that (the second maximum sheet count) of stapleless binding such that the number of sheets that can be bound at a time by staple binding is larger than that by stapleless binding. This configuration of binding mechanism included in the sheet binding unit 4 is a feature of the embodiment. In the embodiment, the sheet binding unit 4 functions as "sheet processing device".

The scanner unit 5 digitizes an original document (hereinafter, "original") by reading the original with a linear image sensor including a plurality of linearly-arranged photodiodes and a light-receiving device such as a CCD (charge coupled device) image sensor or a CMOS (complementary metal oxide semiconductor) image sensor arranged parallel to the photodiodes. The image forming apparatus 1 according to the embodiment is a multifunction peripheral (MFP) having an image capture function, an image forming function, a communication function, and the like and usable as a printer, a facsimile, a scanner, and a copier.

Figure 2:
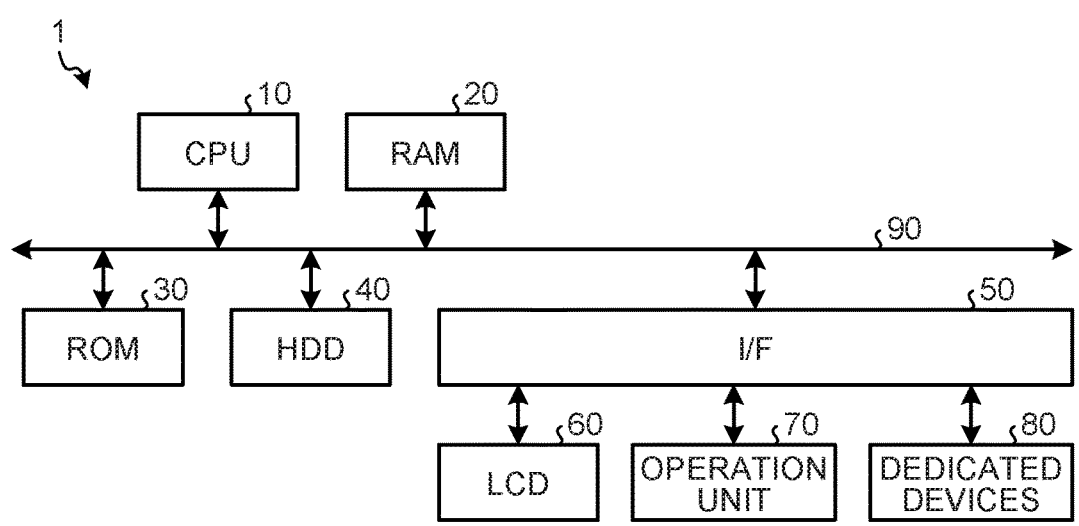
FIG. 2 is a block diagram schematically illustrating a hardware configuration of the image forming apparatus according to the embodiment.

A hardware configuration of the image forming apparatus 1 according to the embodiment is described below with reference to FIG. 2. FIG. 2 is a block diagram schematically illustrating the hardware configuration of the image forming apparatus 1 according to the embodiment. The image forming apparatus 1 includes, in addition to hardware elements illustrated in FIG. 2, engines for performing functions as the scanner and the printer, sheet folding, sheet binding, and the like.

As illustrated in FIG. 2, the image forming apparatus 1 according to the embodiment includes elements similar to those of a typical server, a PC (personal computer), or the like. More specifically, the image forming apparatus 1 according to the embodiment includes a CPU (central processing unit) 10, a RAM (random access memory) 20, a ROM (read only memory) 30, an HDD (hard disk drive) 40, and an I/F 50 that are connected to each other via a bus 90. An LCD (liquid crystal display) 60, an operation unit 70, and dedicated devices 80 are connected to the I/F 50.

The CPU 10, which is a processor, provides overall control of the image forming apparatus 1. The RAM 20, which is a volatile storage medium to and from which information can be written and read out at high speeds, is used as a working area for information processing by the CPU 10. The ROM 30, which is a read-only non-volatile storage medium, stores programs such as firmware. The HDD 40, which is a non-volatile storage medium to and from which information can be written and read out, stores an OS (operating system), various control programs, application programs, and the like.

The I/F 50 connects the bus 90 to various hardware, a network, and the like and controls the connection. The LCD 60 is a visual user interface that allows a user to check a condition of the image forming apparatus 1. The operation unit 70 is a user interface such as a keyboard and/or a mouse for use by a user in inputting information to the image forming apparatus 1.

The dedicated devices 80 are hardware for performing functions respectively dedicated to the image forming unit 2, the sheet feeding unit 3, the sheet binding unit 4, and the scanner unit 5. The dedicated device 80 for the image forming unit 2 is a plotter that forms (outputs) an image on a surface of a sheet media. The dedicated device 80 for the sheet feeding unit 3 is a sheet feeding mechanism that feeds sheets, one at a time, to the image forming unit 2.

The dedicated device 80 for the sheet binding unit 4 is the binding mechanism that performs sheet binding on a plurality of sheets on which images are formed by the image forming unit 2. The configuration of the binding mechanism included in the sheet binding unit 4 is a feature of the embodiment. The dedicated device 80 for the scanner unit 5 is a reading device that reads an image displayed on a surface of a sheet media.

With the hardware configuration described above, a program stored in a storage device such as the ROM 30, the HDD 40, or an optical disk (not shown) is loaded onto the RAM 20. The CPU 10 executes processing in accordance with the program loaded onto the RAM 20, thereby generating software control modules. Functional blocks that perform the functions of the image forming apparatus 1 according to the embodiment are implemented in a combination of the software control modules generated as described above and hardware.

Figure 3:
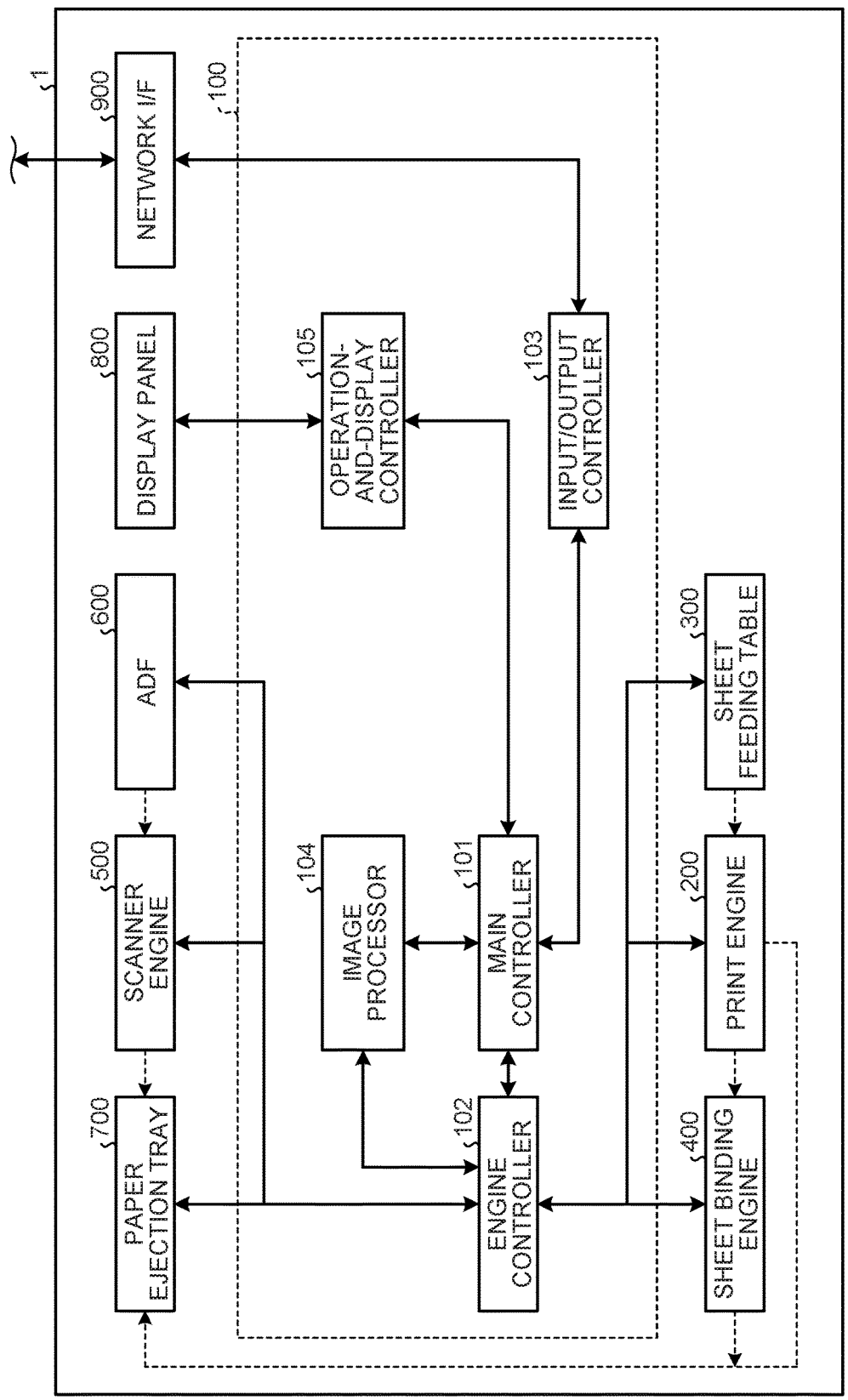
FIG. 3 is a block diagram schematically illustrating a functional configuration of the image forming apparatus according to the embodiment.

A functional configuration of the image forming apparatus 1 according to the embodiment is described below with reference to FIG. 3. FIG. 3 is a block diagram schematically illustrating the functional configuration of the image forming apparatus 1 according to the embodiment. In FIG. 3, electrical connections are indicated by solid lines with arrow heads; flows of a sheet or document bundle are indicated by dashed lines with arrow heads.

As illustrated in FIG. 3, the image forming apparatus 1 according to the embodiment includes a controller 100, a print engine 200, a sheet feeding table 300, a sheet binding engine 400, a scanner engine 500, an ADF (automatic document feeder) 600, a paper ejection tray 700, a display panel 800, and a network I/F 900. The controller 100 includes a main controller 101, an engine controller 102, an input/output controller 103, an image processor 104, and an operation-and-display controller 105.

The print engine 200, which is an image forming part included in the image forming unit 2, prints an image by forming (outputting) an image on a sheet conveyed from the sheet feeding table 300. Specific examples of the print engine 200 include an inkjet image forming mechanism and an electrophotographic image forming mechanism. An image-formed sheet, which is a sheet on which an image is printed by the print engine 200, is either conveyed to the sheet binding unit 4 or ejected onto the paper ejection tray 700. The sheet feeding table 300, which is a sheet feeding part included in the sheet feeding unit 3, feeds sheets, one at a time, to the print engine 200 which is the image forming part.

The sheet binding engine 400 included in the sheet binding unit 4 performs sheet binding on image-formed sheets conveyed from the print engine 200. The sheet binding engine 400 according to the embodiment is configured to be capable of both staple binding and stapleless binding. In the sheet binding engine 400 according to the embodiment, the maximum number of sheets that can be bound at a time (the first maximum sheet count) by staple binding differs from that (the second maximum sheet count) of stapleless binding such that the number of sheets that can be bound at a time by staple binding is larger than that by stapleless binding. The sheets bound by the sheet binding engine 400 are ejected onto the paper ejection tray 700. The configuration of the binding mechanism included in the sheet binding engine 400 is a feature of the embodiment.

The ADF 600 included in the scanner unit 5 automatically conveys an original to the scanner engine 500 which is an original reading part. The scanner engine 500 included in the scanner unit 5 is the original reading part including a photoelectric converter that converts optical information into electrical signals. The scanner engine 500 reads an original automatically conveyed thereto by the ADF 600 or an original placed on a platen glass (not shown) by optically scanning the original and generates image information. The original automatically conveyed to the scanner engine 500 by the ADF 600 and read by the scanner engine 500 is ejected onto a paper ejection tray built in the ADF 600.

The display panel 800 is not only an output interface that provides visual display of a condition of the image forming apparatus 1 but also an input interface used by a user in directly operating the image forming apparatus 1 or entering information to the image forming apparatus 1. More specifically, the display panel 800 has a function of displaying images for receiving operations made by a user. The display panel 800 is implemented in the LCD 60 and the operation unit 70 illustrated in FIG. 2.

The network I/F 900 is an interface that allows the image forming apparatus 1 to communicate with other equipment such as an administrator's terminal via a network. As the network I/F 900, an interface such as Ethernet (registered trademark), USB (universal serial bus), Bluetooth (registered trademark), Wi-Fi (wireless fidelity), or FeliCa (registered trademark) may be used. The network I/F 900 is implemented in the I/F 50 illustrated in FIG. 2.

The controller 100 is implemented in a combination of software and hardware. More specifically, a control program such as firmware stored in a non-volatile storage medium such as the ROM 30 or the HDD 40 is loaded onto the RAM 20. The CPU 10 executes processing in accordance with the program loaded onto the RAM 20, thereby generating software control modules. The controller 100 is implemented in the software control modules and hardware such as an integrated circuit. The controller 100 functions as a control part that provides overall control of the image forming apparatus 1.

The main controller 101 performs a function of controlling the blocks included in the controller 100 and feeds commands to the blocks of the controller 100. The main controller 101 controls the input/output controller 103 to access other equipment via the network I/F 900 and a network. The engine controller 102 controls drivers of the print engine 200, the sheet feeding table 300, the sheet binding engine 400, the scanner engine 500, and the like or causes the drivers to drive the same. The input/output controller 103 feeds signals and commands input thereto via the network I/F 900 and a network to the main controller 101.

The image processor 104 generates, under control of the main controller 101, print information from document data or image data contained in an input print job. The print information is data, such as CMYK bitmap data, according to which the print engine 200, which is the image forming part, prints an image by performing an image forming operation. Furthermore, the image processor 104 generates image data by processing captured image data fed from the scanner engine 500. The image data is information stored in the image forming apparatus 1 or transmitted to other equipment via the network I/F 900 and a network as a result of a scanner operation. The operation-and-display controller 105 displays information on the display panel 800 or notifies the main controller 101 of information entered via the display panel 800.

Figure 4:
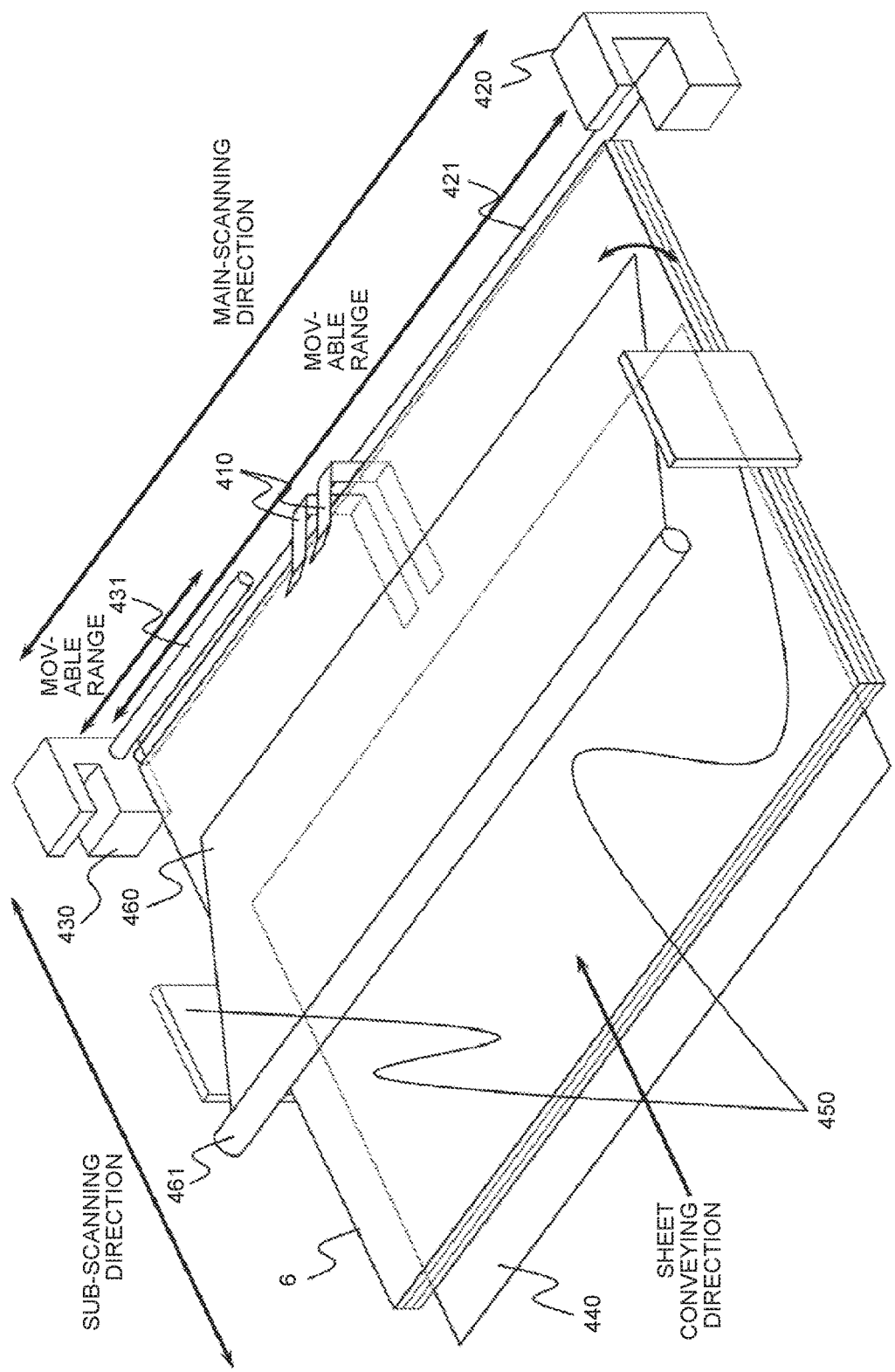
FIG. 4 is a perspective view of a sheet binding engine according to the embodiment.
Figure 5:
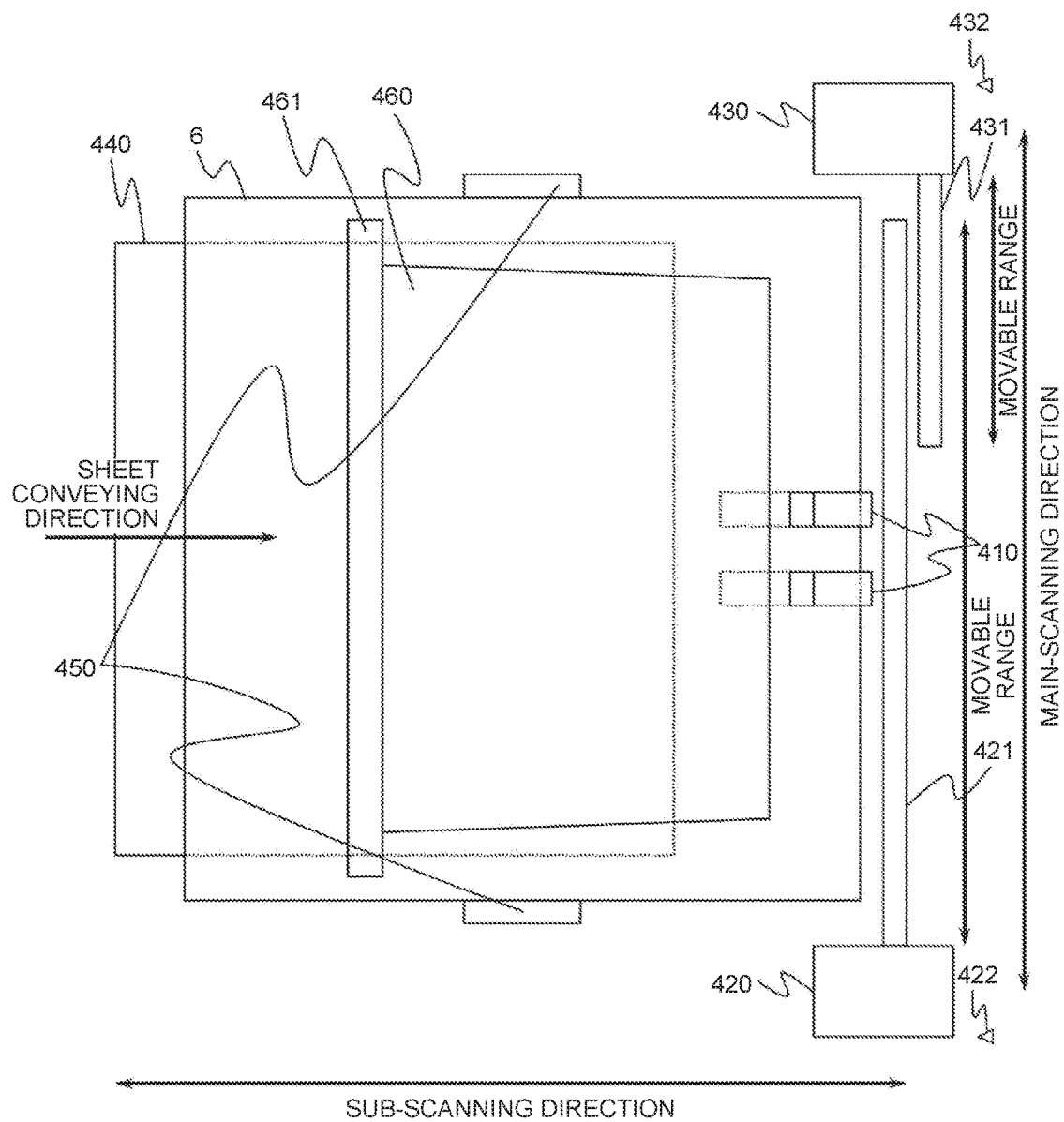
FIG. 5 is a plan view of the sheet binding engine according to the embodiment.
Figure 6:
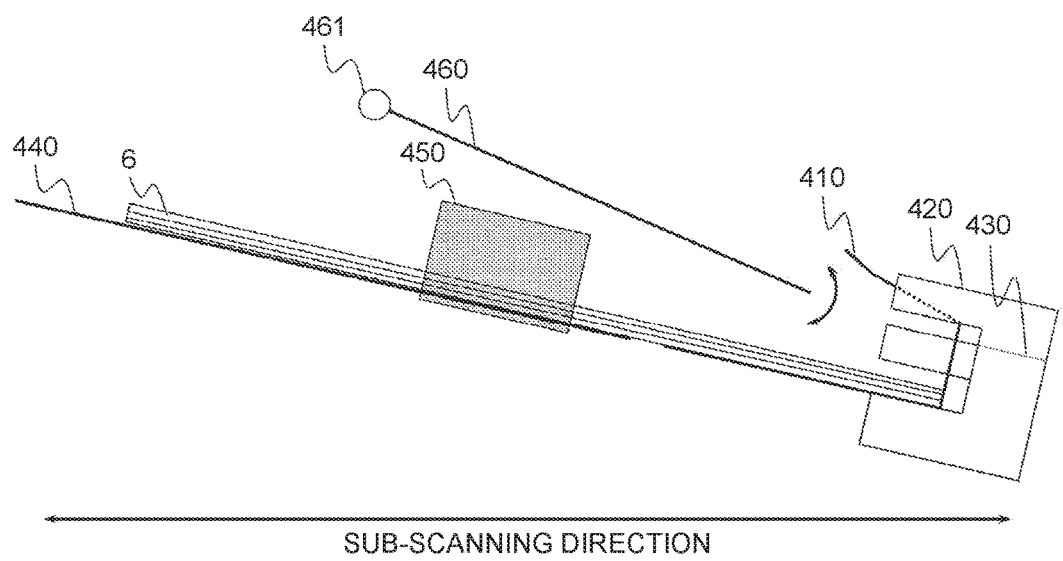
FIG. 6 is a side view, as viewed along the main-scanning direction, of the sheet binding engine according to the embodiment.

A configuration of the sheet binding unit 4 according to the embodiment is described below with reference to FIGS. 4 to 6. FIG. 4 is a perspective view of the sheet binding engine 400 according to the embodiment. FIG. 5 is a plan view of the sheet binding engine 400 according to the embodiment. FIG. 6 is a side view, as viewed along the main-scanning direction, of the sheet binding engine 400 according to the embodiment.

As illustrated in FIGS. 4 to 6, the sheet binding engine 400 according to the embodiment includes a compiling unit 410, a staple binding unit 420, a staple-binding-unit guide rail 421, a staple-binding-unit detection sensor 422, a stapleless binding unit 430, a stapleless-binding-unit guide rail 431, a stapleless-binding-unit detection sensor 432, a sheet support plate 440, registration guides 450, a movable guide plate 460, and a movable-guide-plate pivot-support member 461.

The compiling unit 410 holds sheets in a pile until all to-be-bound sheets are placed therein. Put another way, the compiling unit 410 holds sheets until all of the plurality of to-be-bound sheets are placed therein. The number of the to-be-bound sheets is equal to or smaller than a larger one of the maximum sheet count of the staple binding unit 420 and that of the stapleless binding unit 430. In other words, in the embodiment, the compiling unit 410 functions as "sheet tray".

Figure 7:
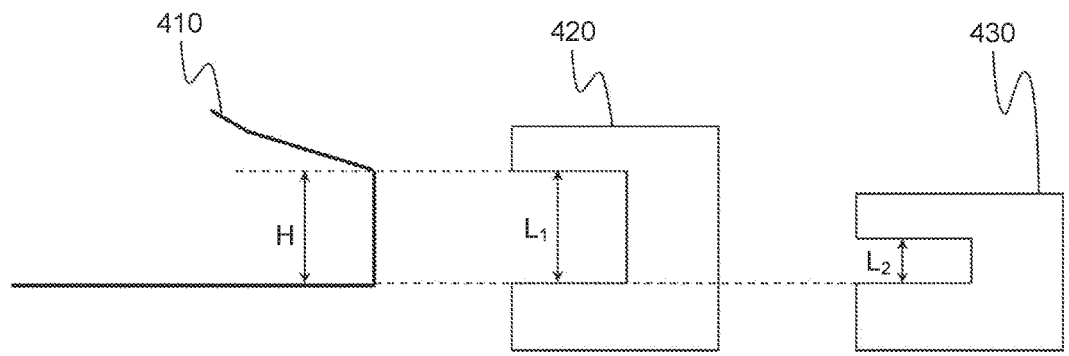
FIG. 7 is a diagram illustrating size relation among height of a compiling unit, opening height of a staple binding unit, and opening height of a stapleless binding unit according to the embodiment.

The compiling unit 410 according to the embodiment is designed to have a height H in the sheet thickness direction adjusted to the larger one of the maximum sheet count of staple binding and that of stapleless binding; in short, the height H is adjusted to staple binding. Hence, the compiling unit 410 is configured to have the height H in the sheet thickness direction that is equal to an opening height $L_1$ of a binding channel of the staple binding unit 420 as illustrated in FIG. 7.

Accordingly, in the embodiment, the following relation holds: $H=L_1>L_2$, where H is the height of the compiling unit 410 in the sheet thickness direction, $L_1$ is the opening height of the binding channel of the staple binding unit 420, and $L_2$ is an opening height of a binding channel of the stapleless binding unit 430. FIG. 7 is a diagram illustrating size relation among the height H of the compiling unit 410 in the sheet thickness direction, the opening height $L_1$ of the binding channel of the staple binding unit 420, and the opening height $L_2$ of the binding channel of the stapleless binding unit 430.

Figure 8:
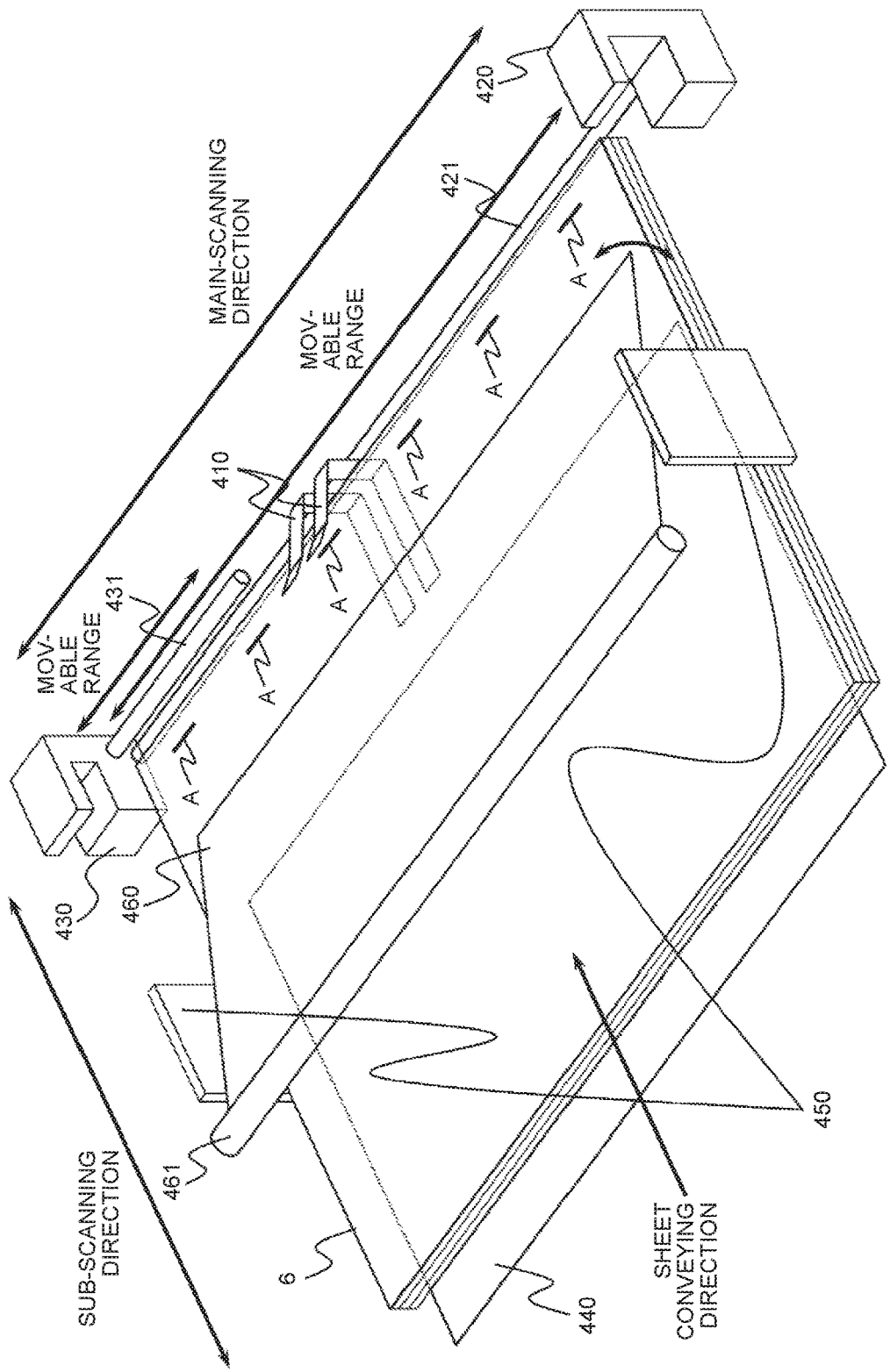
FIG. 8 is a perspective view of the sheet binding engine according to the embodiment.
Figure 9:
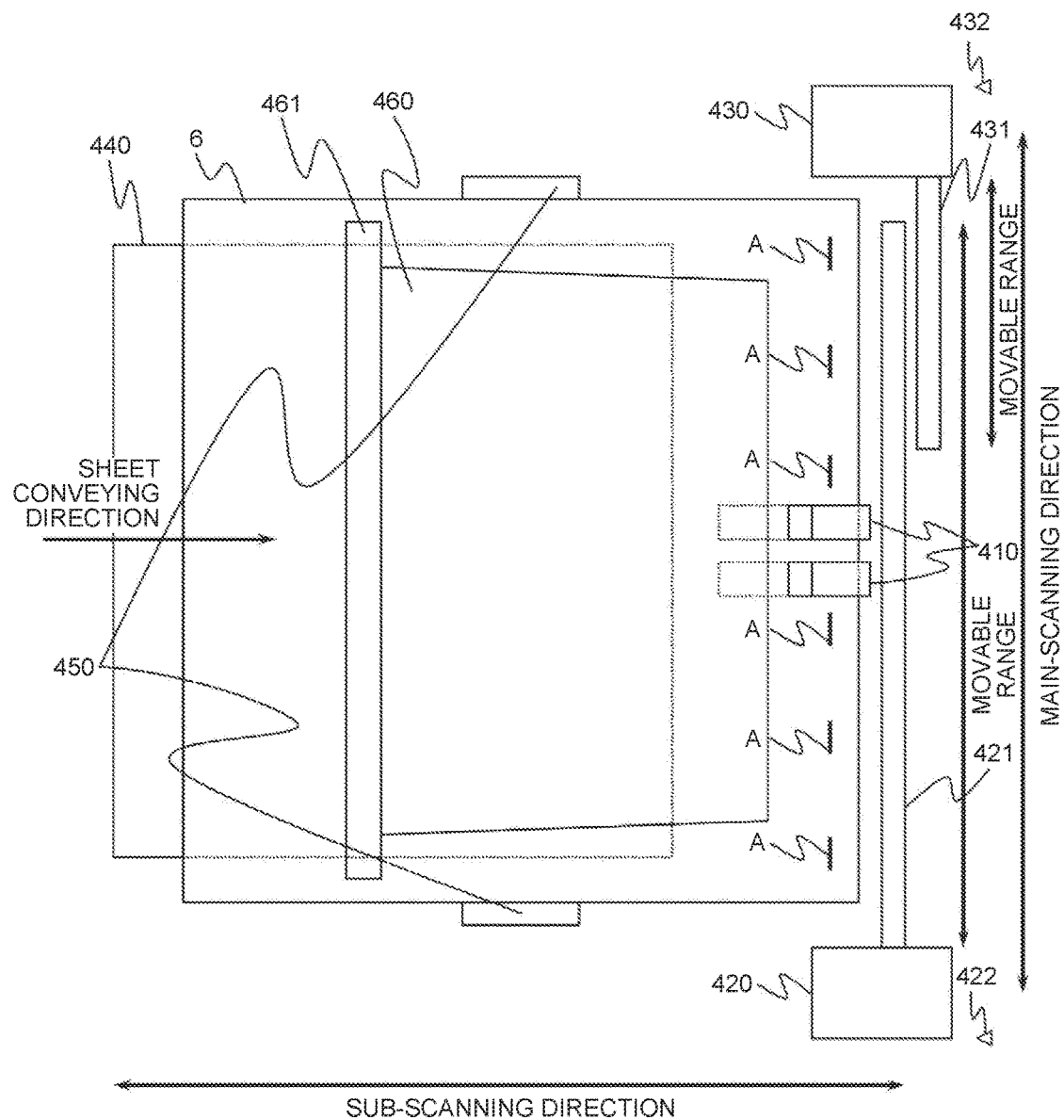
FIG. 9 is a plan view of the sheet binding engine according to the embodiment.
Figure 10:
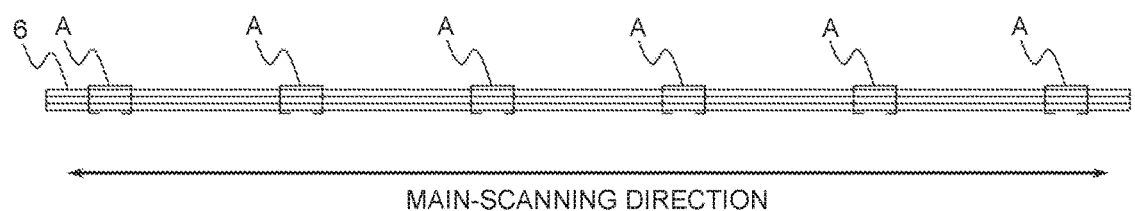
FIG. 10 is a side view, as viewed along the sub-scanning direction, of a sheet bundle bound by the staple binding unit according to the embodiment.

In a pre-sheet-binding phase, the staple binding unit 420 is on standby at its home position. When sheet binding starts, the staple binding unit 420 moves from the home position to a binding position on the staple-binding-unit guide rail 421. The staple binding unit 420 binds a sheet bundle 6 by inserting a staple A through the sheet bundle 6 at each of a plurality of binding positions while sandwiching the sheet bundle 6 from above and below sheet surfaces in the binding channel as illustrated in FIGS. 8 to 10. FIG. 8 is a perspective view of the sheet binding engine 400 according to the embodiment. FIG. 9 is a plan view of the sheet binding engine 400 according to the embodiment. FIG. 10 is a side view, as viewed along the sub-scanning direction, of the sheet bundle 6 bound by the staple binding unit 420 according to the embodiment.

Upon completing sheet binding, the staple binding unit 420 returns to the home position on the staple-binding-unit guide rail 421. Meanwhile, the sheet binding unit 4 according to the embodiment detects that the staple binding unit 420 is on standby at the home position or has returned to the home position based on a result of detection of the staple binding unit 420 by the staple-binding-unit detection sensor 422.

Figure 11:
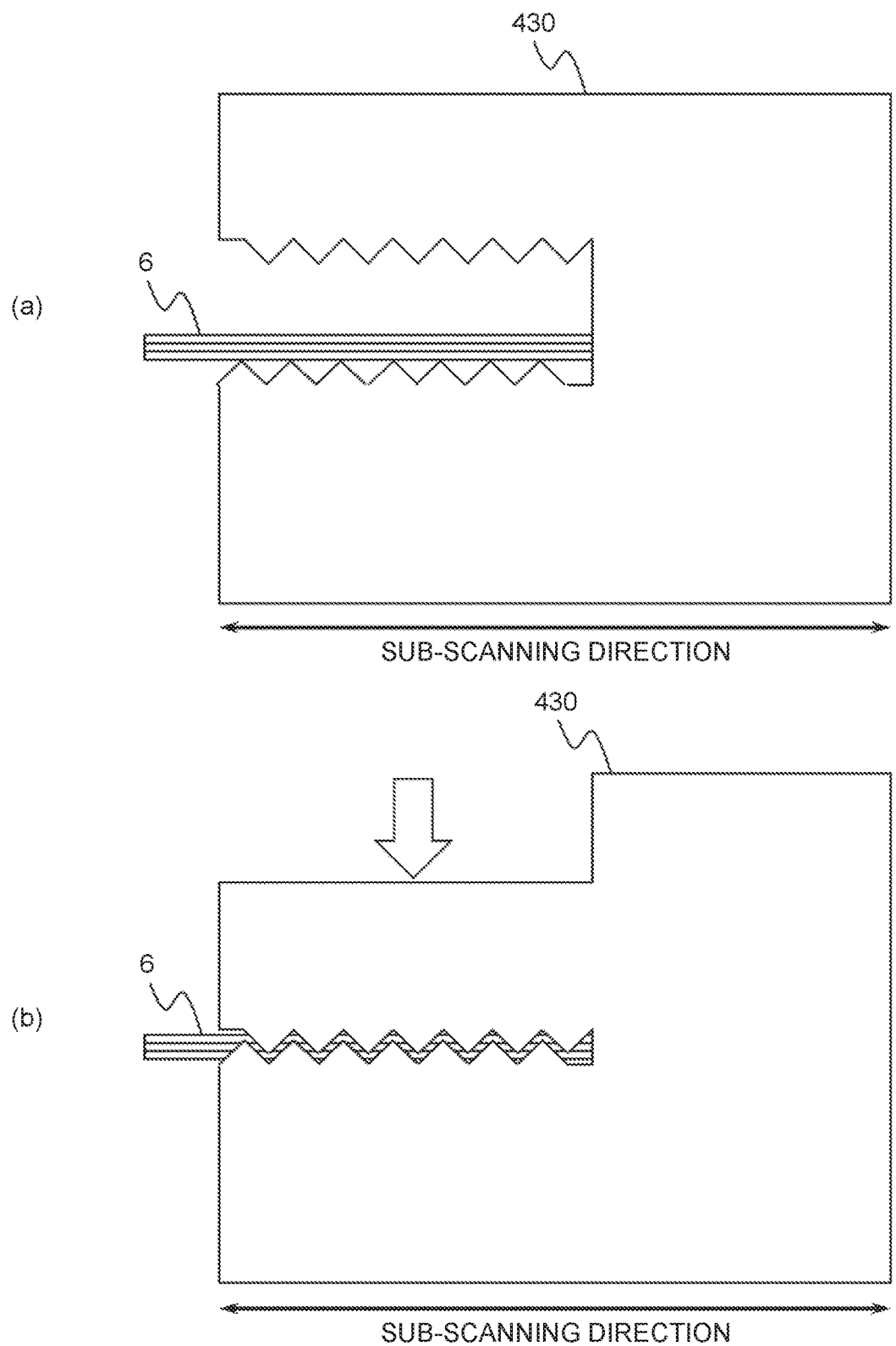
FIG. 11 illustrates side views, as viewed along the main-scanning direction, of the stapleless binding unit according to the embodiment.
Figure 12:
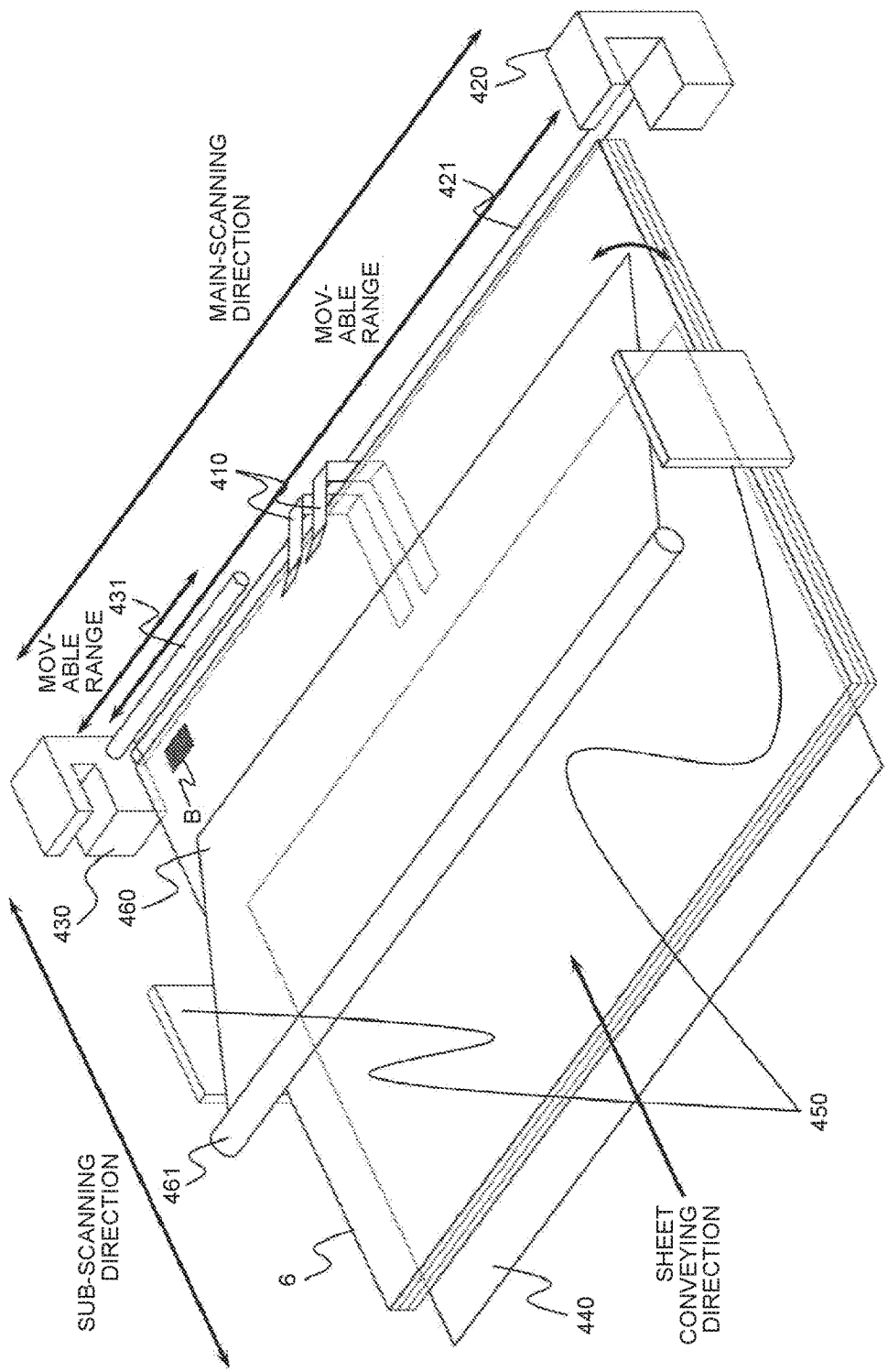
FIG. 12 is a perspective view of the sheet binding engine according to the embodiment.
Figure 13:
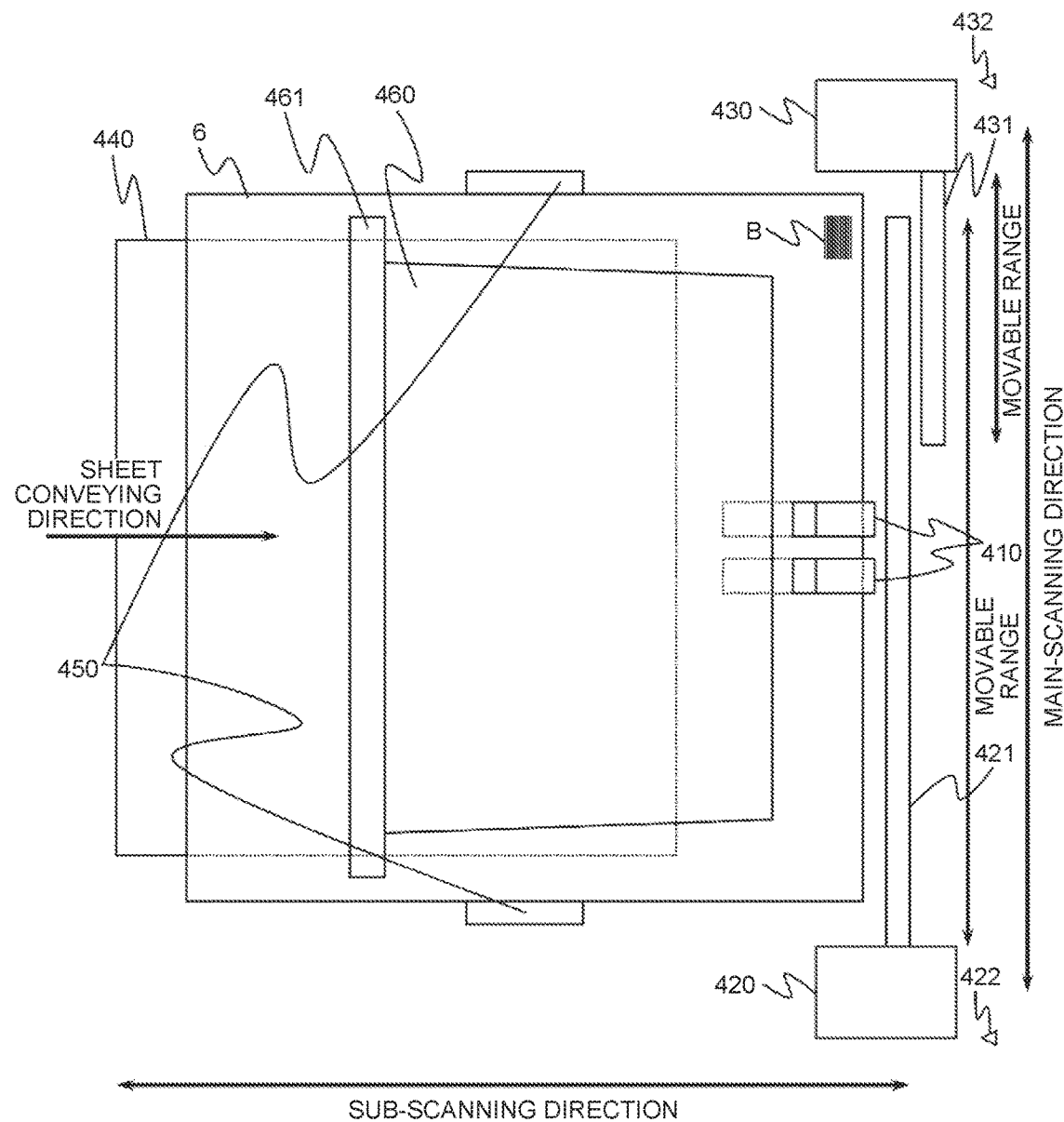
FIG. 13 is a plan view of the sheet binding engine according to the embodiment.
Figure 14:
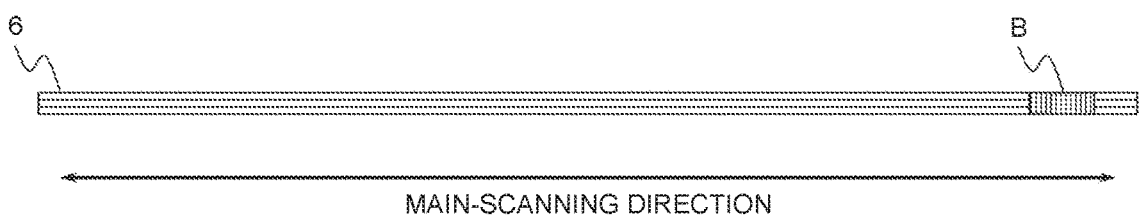
FIG. 14 is a side view, as viewed along the sub-scanning direction, of a sheet bundle bound by the stapleless binding unit according to the embodiment.

In a pre-sheet-binding phase, the stapleless binding unit 430 is on standby at its home position. When sheet binding starts, the stapleless binding unit 430 moves from the home position to a binding position on the stapleless-binding-unit guide rail 431. The stapleless binding unit 430 binds the sheet bundle 6 by compressing the sheet bundle 6 from above and below sheet surfaces in the binding channel having the shape of an upper toothed jaw and a lower toothed jaw that can mesh with each other as illustrated in FIG. 11. In the sheet bundle 6 compressed in this manner, fibers of adjacent sheets are entangled at a binding position B illustrated in FIGS. 12 to 14, causing the sheet bindle 6 to be bound. FIG. 11 illustrates side views, as viewed along the main-scanning direction, of the stapleless binding unit 430 according to the embodiment FIG. 12 is a perspective view of the sheet binding engine 400 according to the embodiment. FIG. 13 is a plan view of the sheet binding engine 400 according to the embodiment. FIG. 14 is a side view, as viewed along the sub-scanning direction, of the sheet bundle 6 bound by the stapleless binding unit 430 according to the embodiment.

Upon completing sheet binding, the stapleless binding unit 430 returns to the home position on the stapleless-binding-unit guide rail 431. Meanwhile, the sheet binding unit 4 according to the embodiment detects that the stapleless binding unit 430 is on standby at the home position or has returned to the home position based on a result of detection of the stapleless binding unit 430 by the stapleless-binding-unit detection sensor 432. Thus, in the embodiment, the staple binding unit 420 and the stapleless binding unit 430 function as "a plurality of binding units" which differ from each other in the maximum number of sheets that can be bound at a time by the binding unit.

The sheet support plate 440 supports the bottom surface of the sheet bundle 6 stacked in the compiling unit 410. The registration guides 450 align the position of the sheet bundle 6 stacked in the compiling unit 410 in the main-scanning direction.

The movable guide plate 460 pivots about the movable-guide-plate pivot-support member 461. The movable guide plate 460 pivots such that a height P of the movable guide plate 460 in the sheet thickness direction varies depending on the maximum sheet count. More specifically, the movable guide plate 460 pivots such that the height P in the sheet thickness direction varies depending on by which one of the staple binding unit 420 and the stapleless binding unit 430 the sheet bundle 6 is to be bound.

Figure 15:
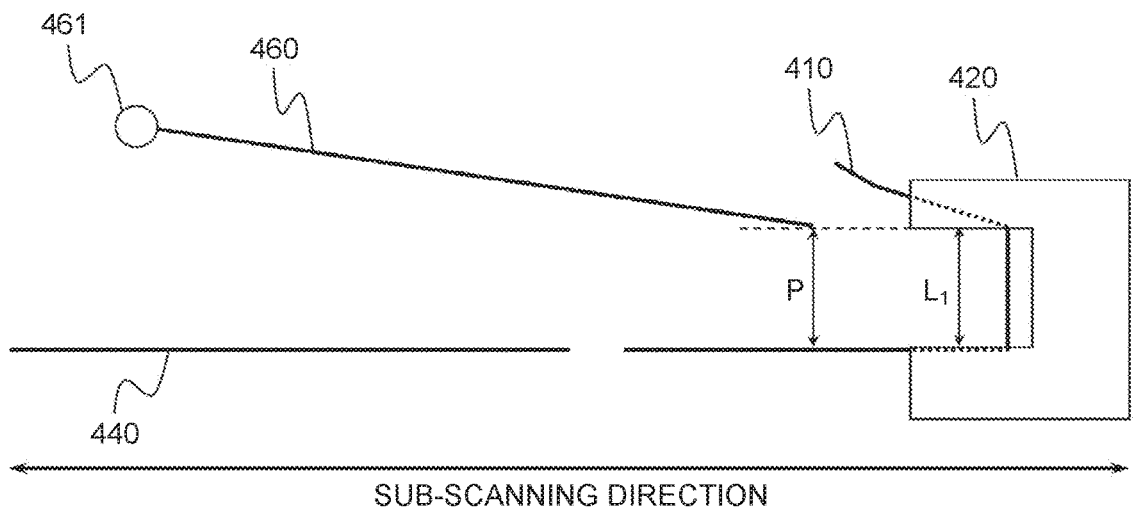
FIG. 15 is a side view, as viewed along the main-scanning direction, of the sheet binding engine according to the embodiment.
Figure 16:
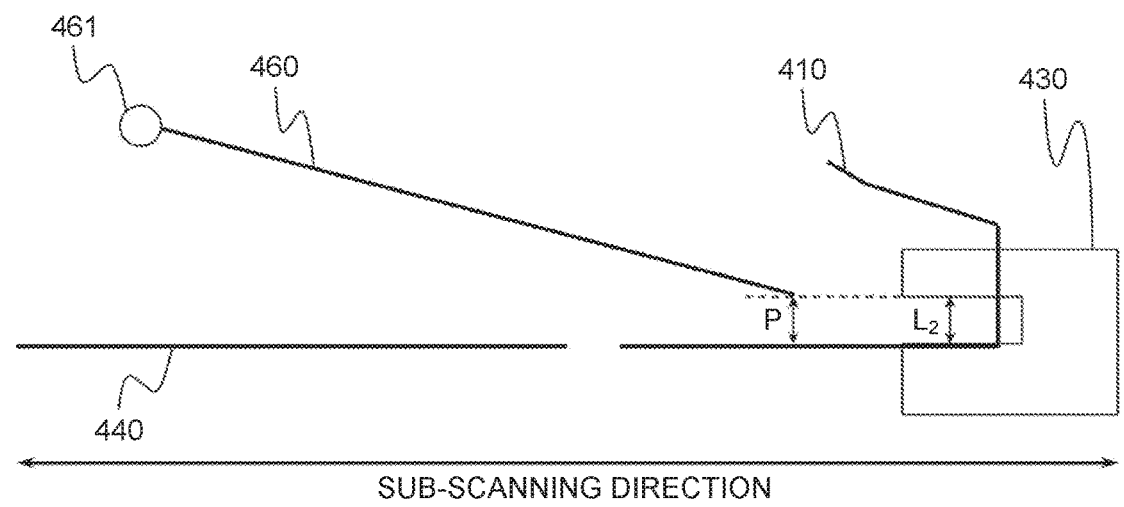
FIG. 16 is a side view, as viewed along the main-scanning direction, of the sheet binding engine according to the embodiment.

This is described more specifically below. When the sheet bundle 6 is to be bound by the staple binding unit 420, the sheet binding unit 4 according to the embodiment causes the movable guide plate 460 to pivot so as to make the height P equal to or larger than the opening height $L_1$ of the binding channel of the staple binding unit 420 as illustrated in FIG. 15. On the other hand, when the sheet bundle 6 is to be bound by the stapleless binding unit 430, the sheet binding unit 4 according to the embodiment causes the movable guide plate 460 to pivot so as to make the height P equal to the opening height $L_2$ of the binding channel of the stapleless binding unit 430 as illustrated in FIG. 16. FIG. 15 is a side view, as viewed along the main-scanning direction, of the sheet binding engine 400 according to the embodiment. FIG. 16 is a side view, as viewed along the main-scanning direction, of the sheet binding engine 400 according to the embodiment. A feature of the sheet binding unit 4 according to the embodiment lies in this operation of causing the movable guide plate 460 to pivot in this manner.

Hence, in the embodiment, the movable guide plate 460 functions as "stacked-sheet-count limiting unit" situated to move toward and away from sheets held in the sheet tray in the sheet thickness direction and configured to limit the number of sheets held in the sheet tray by varying the distance from a surface, which supports the sheets, of the sheet tray depending on the maximum sheet count of a selected one of the plurality of binding units.

The reason why the sheet binding unit 4 according to the embodiment causes the height P to vary depending on the maximum sheet count or, more specifically, causes the movable guide plate 460 to pivot so as to vary the height P depending on by which one of the staple binding unit 420 and the stapleless binding unit 430 the sheet bundle 6 is to be bound, is described below with reference to FIG. 17, FIG. 18, and FIG. 19. FIG. 17 illustrates side views, as viewed along the main-scanning direction, of the sheet binding engine 400 not including the movable guide plate 460 according to the embodiment. FIG. 18 illustrates side views, as viewed along the main-scanning direction, of the sheet binding engine 400 not including the movable guide plate 460 according to the embodiment. FIG. 19 illustrates side views, as viewed along the main-scanning direction, of the sheet binding engine 400 according to the embodiment.

When the sheet bundle 6 containing the first maximum sheet count of sheets is to be bound using the staple binding unit 420 by the sheet binding unit 4 not including the movable guide plate 460, the thickness of the sheet bundle 6 does not exceed the opening height $L_1$ of the binding channel of the staple binding unit 420. This is because the height H of the compiling unit 410 in the sheet thickness direction is equal to the opening height $L_1$ of the binding channel as illustrated in (a) in FIG. 17. Accordingly, even when the sheet bundle 6 containing the first maximum sheet count of sheets is to be bound using the staple binding unit 420, the sheet binding unit 4 not including the movable guide plate 460 can receive the sheet bundle 6 into the binding channel of the staple binding unit 420.

When the sheet bundle 6 containing sheets less than the first maximum sheet count is to be bound using the staple binding unit 420 by the sheet binding unit 4 not including the movable guide plate 460, a clearance in the sheet thickness direction is left in the compiling unit 410. This is because the thickness of the sheet bundle 6 is smaller than the height H of the compiling unit 410 in the sheet thickness direction. Accordingly, in this case, curling, deflection, or the like can occur at the binding position and increase the thickness of the sheet bundle 6 equal to or larger than "should be thickness".

However, the height H of the compiling unit 410 in the sheet thickness direction is equal to the opening height $L_1$ of the binding channel of the staple binding unit 420. For this reason, even if the curling or deflection should occur, the thickness of the sheet bundle 6 does not exceed the opening height $L_1$ of the binding channel of the staple binding unit 420 as illustrated in (b) in FIG. 17. Accordingly, even when the sheet bundle 6 containing sheets less than the first maximum sheet count is to be bound using the staple binding unit 420, the sheet binding unit 4 not including the movable guide plate 460 can receive the sheet bundle 6 into the binding channel of the staple binding unit 420.

When the sheet bundle 6 containing the second maximum sheet count of sheets is to be bound using the stapleless binding unit 430 by the sheet binding unit 4 not including the movable guide plate 460, a clearance in the sheet thickness direction is left in the compiling unit 410. This is because the thickness of the sheet bundle 6 is smaller than the height H of the compiling unit 410 in the sheet thickness direction. Accordingly, in this case, curling, deflection, or the like can occur at the binding position and increase the thickness of the sheet bundle 6 equal to or larger than "should be thickness".

When the thickness of the sheet bundle 6 is increased to be equal to or larger than "should be thickness", the thickness of the sheet bundle 6 exceeds the opening height $L_2$ of the binding channel of the stapleless binding unit 430 as illustrated in (a) in FIG. 18. This is because the opening height $L_2$ of the binding channel of the stapleless binding unit 430 is smaller than the height H of the compiling unit 410 in the sheet thickness direction as described earlier. Accordingly, when the sheet bundle 6 containing the second maximum sheet count of sheets is to be bound using the stapleless binding unit 430, the sheet binding unit 4 not including the movable guide plate 460 cannot receive the sheet bundle 6 into the binding channel of the stapleless binding unit 430, which is undesirable.

Similarly, when the sheet bundle 6 containing sheets less than the second maximum sheet count is to be bound using the stapleless binding unit 430 by the sheet binding unit 4 not including the movable guide plate 460, a clearance in the sheet thickness direction is left in the compiling unit 410. This is because the thickness of the sheet bundle 6 is smaller than the height H of the compiling unit 410 in the sheet thickness direction. Accordingly, in this case, curling, deflection, or the like can occur at the binding position and increase the thickness of the sheet bundle 6 equal to or larger than "should be thickness".

When the thickness of the sheet bundle 6 is increased to be equal to or larger than "should be thickness", the thickness of the sheet bundle 6 exceeds the opening height $L_2$ of the binding channel of the stapleless binding unit 430 as illustrated in (b) in FIG. 18. This is because the opening height $L_2$ of the binding channel of the stapleless binding unit 430 is smaller than the height H of the compiling unit 410 in the sheet thickness direction as described earlier. Accordingly, when the sheet bundle 6 containing sheets less than the second maximum sheet count is to be bound using the stapleless binding unit 430, the sheet binding unit 4 not including the movable guide plate 460 cannot receive the sheet bundle 6 into the binding channel of the stapleless binding unit 430, which is undesirable.

As described above, when the sheet bundle 6 is to be bound using the staple binding unit 420, the sheet binding unit 4 not including the movable guide plate 460 can receive the sheet bundle 6 into the binding channel of the staple binding unit 420. However, when the sheet bundle 6 is to be bound using the stapleless binding unit 430, an undesirable situation where the sheet bundle 6 cannot be received into the binding channel of the stapleless binding unit 430 can occur.

To avoid this undesirable situation, as described above with reference to FIGS. 15 and 16, the sheet binding unit 4 according to the embodiment is configured to cause the movable guide plate 460 to pivot to vary the height P in the sheet thickness direction depending on the maximum sheet count or, more specifically, to vary the height P in the sheet thickness direction depending on by which one of the staple binding unit 420 and the stapleless binding unit 430 the sheet bundle 6 is to be bound.

This is described more specifically below. The sheet binding unit 4 according to the embodiment is configured to cause, when the sheet bundle 6 is to be bound by the staple binding unit 420, the movable guide plate 460 to pivot so as to make the height P equal to or larger than the opening height $L_1$ of the binding channel of the staple binding unit 420 as illustrated in FIG. 15. On the other hand, the sheet binding unit 4 according to the embodiment is configured to cause, when the sheet bundle 6 is to be bound by the stapleless binding unit 430, the movable guide plate 460 to pivot so as to make the height P equal to the opening height $L_2$ of the binding channel of the stapleless binding unit 430 as illustrated in FIG. 16.

Hence, in the sheet binding unit 4 according to the embodiment, when the sheet bundle 6 is to be bound using the stapleless binding unit 430, even if the curling, deflection, or the like occurs due to a clearance that is left in the thickness direction of sheets stacked in the compiling unit 410, the thickness of the sheet bundle 6 does not exceed the movable guide plate 460. As a result, when the sheet binding unit 4 according to the embodiment performs sheet binding using the stapleless binding unit 430, even if the curling, deflection, or the like occurs due to a clearance created in the thickness direction of sheets stacked in the compiling unit 410, the thickness of the sheet bundle 6 does not exceed the opening height $L_2$ of the binding channel of the stapleless binding unit 430 as illustrated in FIG. 19. Accordingly, an undesirable situation that the sheet bundle 6 cannot be received into the binding channel of the stapleless binding unit 430 will not occur.

Hence, the sheet binding unit 4 according to the embodiment can reliably receive the sheet bundle 6 even when the sheet bundle 6 is to be bound using the stapleless binding unit 430 and the sheet binding unit 4 does not include compiling units independently, one for staple binding and the other for stapleless binding. The sheet binding unit 4 according to the embodiment can be inexpensively manufactured and perform sheet binding with the compact and simple configuration.

Meanwhile, the sheet binding unit 4 according to the embodiment is configured to cause, when the sheet bundle 6 is to be bound using the staple binding unit 420, the movable guide plate 460 to pivot so as to make the height P equal to or larger than the opening height $L_1$ of the binding channel of the staple binding unit 420 as described with reference to FIG. 15. Therefore, in the sheet binding unit 4 according to the embodiment, even when the sheet bundle 6 is to be bound using the staple binding unit 420, the movable guide plate 460 does not interfere with sheet conveyance.

The closer the side, at which the height P is measured and which is the side opposite from the movable-guide-plate pivot-support member 461, of the movable guide plate 460 to the binding channel of the stapleless binding unit 430, the greater the advantage of the embodiment of the sheet binding unit 4 according to the embodiment.

As described with reference to FIGS. 15 and 16, the example in which the sheet binding unit 4 according to the embodiment is configured to cause the movable guide plate 460 to pivot to vary the height P in the sheet thickness direction depending on the maximum sheet count has been described. The sheet binding unit 4 according to the embodiment may be modified to cause the movable guide plate 460 to pivot to vary the height P in the sheet thickness direction depending on the number of sheets to be bound at a time or, in other words, depending on the number of sheets stacked in the compiling unit 410 to make up the sheet bundle 6.

As described with reference to FIGS. 15 and 16, the example in which the sheet binding unit 4 according to the embodiment is configured to cause the movable guide plate 460 to pivot to vary the height P in the sheet thickness direction depending on the maximum sheet count has been described. The sheet binding unit 4 according to the embodiment may be modified such that the movable guide plate 460 is freely pivotable and presses an uppermost sheet of the sheet bundle 6 stacked in the compiling unit 410 under its own weight. The sheet binding unit 4 according to the embodiment may be modified such that the movable guide plate 460 is freely pivotable within a range where the height P in the sheet thickness direction does not exceed the maximum sheet count and presses the uppermost sheet of the sheet bundle 6 stacked in the compiling unit 410 under its own weight.

This modification in which the movable guide plate 460 according to the embodiment is freely pivotable prevents, so long as the movable guide plate 460 is configured to be of a weight that will not hamper sheet conveyance, sheets from being damaged or stained by the movable guide plate 460.

As described with reference to FIG. 16, the example in which the sheet binding unit 4 according to the embodiment is configured to cause the movable guide plate 460 to pivot to vary the height P in the sheet thickness direction depending on the maximum sheet count has been described. Regarding when the movable guide plate 460 is to be pivoted, the movable guide plate 460 may be pivoted either before the sheets are stacked or after all the to-be-bound sheets are stacked.

In the embodiment, the example in which the image forming apparatus 1 includes the image forming unit 2, the sheet feeding unit 3, the sheet binding unit 4, and the scanner unit 5 has been described. Alternatively, a configuration in which the units are configured as independent devices, and the devices are connected to each other to form an image forming system may be employed.

According to the embodiment described above, a sheet processing device capable of binding sheets without interfering with sheet conveyance with an inexpensive, compact, and simple configuration is provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sheet processing device, comprising:
   a sheet tray configured to hold a plurality of sheets;
   a staple binding unit configured to bind the plurality of sheets with a staple;
   a stapleless binding unit configured to bind the plurality of sheets with a pair of compressing members but without a staple;
   a stopper configured to abut a downstream end portion of the plurality of sheets in a sheet conveying direction; and
   a guide member configured to pivot about a fixed shaft in a thickness direction of the plurality of sheets on an upstream side in the sheet conveying direction with respect to the stopper, the fixed shaft not being movable in the sheet conveying direction, the guide member being a plate member, wherein
   a portion of the stopper has a C-shape as viewed from a direction perpendicular to the sheet conveying direction,
   a length of the guide member in the direction perpendicular to the sheet conveying direction is longer than a length of the stopper in the direction perpendicular to the sheet conveying direction, and
   a downstream end portion of the guide member in the sheet conveying direction is located on an upstream side with respect to an upstream end portion of the stopper in the sheet conveying direction.

2. An image forming system comprising the sheet processing device according to claim 1.

3. The sheet processing device according to claim 1, wherein the stapleless binding unit is configured to be movable in a direction perpendicular to the direction of sheet conveyance independently from the staple binding unit.

4. The sheet processing device according to claim 1, wherein the guide member is configured to be movable in the thickness direction of the plurality of sheets which are held in the sheet tray by a weight of the guide member.

5. The sheet processing device according to claim 1, wherein a gap between a lower limit position of the guide member in a pivoting direction and a surface of the sheet tray on which the sheets are supported is equal to or less than an opening height of the stapleless binding unit.

6. The sheet processing device according to claim 1, wherein a portion of the stopper abutting the sheets has a height that is more than the opening height of the stapleless binding unit and equal to or less than an opening height of the staple binding unit.

* * * * *